United States Patent [19]

Schaaf

[11] Patent Number: 4,497,207

[45] Date of Patent: Feb. 5, 1985

[54] SPIN-CHECK DEVICE FOR ARROWS

[76] Inventor: Bruce M. Schaaf, 2629 Woodlawn Ave., Erie, Pa. 16510

[21] Appl. No.: 539,702

[22] Filed: Oct. 6, 1983

[51] Int. Cl.³ .......................................... G01M 19/00
[52] U.S. Cl. .................................... 73/432 R; 73/460
[58] Field of Search ................... 73/460, 432 R, 432 V

[56] References Cited

U.S. PATENT DOCUMENTS 3,333,474  8/1967  Hercher ............................ 73/432 V
3,479,885  11/1969  Karpchuk ............................ 73/460

Primary Examiner—S. Clement Swisher
Attorney, Agent, or Firm—Charles L. Lovercheck; Wayne L. Lovercheck; Dale R. Lovercheck

[57] ABSTRACT

A testing apparatus for arrows is disclosed. The apparatus is made up of a stand with a v-block on it. The v-block is adjustable up and down on the stand and an arrow tip support is rotatably supported on the stand it is driven by a motor with a speed control so that an arrow leaning against the v-block and its point resting on the tip support is rotated at an optimum speed so that it can be visually checked for broadhead alignment, nock alignment, and arrow straightness.

10 Claims, 2 Drawing Figures

SPIN-CHECK DEVICE FOR ARROWS

BRIEF STATEMENT OF INVENTION

This tool disclosed herein is sometimes referred to as a "Spin-Check". It has three functions. Broadhead alignment, nock alignment and arrow straightness can all be checked with this tool. The tool will accept all arrows, regardless of size and length. It will accept all broadheads, field and target points with a conically shaped, solid point. It will not work on broadheads on which the blades extend to the very extreme tip.

Major components consist of a single "D" size 1.5 volt battery, a toggle switch for on-off control, a "pause" switch for intermittant starting and stopping, a vertical 5/16" steel rod with a v-block to support the arrow, a potentiometer for speed control, and a 1.5 to 6 volt D.C. motor.

To operate the "Spin-Check", an arrow is placed in the vertical position with the point resting in the hole on the motor shaft adapter, and the arrow leaning into the notch in the v-block. The v-block, as well as the 5/16" support rod, can be adjusted for any length arrow. The support rod can also be swiveled on its axis for optimum arrow lean. The best height adjustment for the v-block is approximately ¾" below the vanes or fletching on the arrow.

Start by placing an arrow as described previously. Turn the speed control knob as far as it will go in a clockwise direction. This will prevent the motor from running when the toggle switch is turned on.

Next, turn on the toggle switch. The motor will not run until the speed control knob is turned in a counterclockwise direction. Slowly turn the speed control knob until the motor and arrow start to spin. The ideal spin speed of the arrow is up to the individual, but you will find that a relatively slow speed is preferable, since too much speed tends to blur out any apparent misalignment in the broadhead or arrow nock.

Misalignment in the broadhead will be immediately apparent by observing a wobble at the point where the ferrule and the arrow are joined. A very slight wobble is acceptable, but any more than that is not, since a misaligned broadhead will fly poorly. Try different arrow broadhead combinations until there is no or little apparent wobble. This method will usually work. If not, it may be necessary to replace the insert bushing on the arrow, or slightly bend the male thread on the broadhead ferrule. With this method, it is possible to be certain that all broadheads are aligned perfectly.

To check for nock alignment, adjust arrow speed using the same procedure as for broadhead alignment, although a slightly slower speed may be desirable. Observe the circle formed by the two extreme tips of the arrow nock as it spins. This circle should be very clearly defined. (Do not spin the arrow too fast, as the resulting blur will tend to make even poorly aligned nocks appear acceptable). Any misalignment of the nock will be very noticeable, as the circle formed by the tips of the nock will have a definite wobble. If wobble is apparent, this is not acceptable. Remove the nock and cut off as much of the remaining plastic and cement as possible. Next sand the remaining material off using fine emery cloth while turning the arrow so as not to cause any flat spots on the shaft taper. Cement a new nock on the shaft, making sure it is seated properly. Check it immediately with the "Spin-Check". With a little practice it is possible to align the nock perfectly before the cement has time to "set".

To check for arrow straightness, it is best to have a field or target point installed on the arrow. Make sure the point has no significant irregularities in it. If there are any irregularities, they may be filed off with a fine metal file. (careful not to cause flat spots). Start the arrow spinning as stated previously. If the arrow is bent, you will immediately observe wobble in the arrow shaft. A bent arrow cannot be depended on to fly true, and should be either straightened or replaced.

The "pause" switch will stop the motor as long as it is held down. When it is released, the motor will run. This button simplifies changing arrows in the "Spin-Check". Simply press the button and hold, remove the arrow, place another in position, and release the button. The motor will start automatically.

REFERENCE TO PRIOR ART

The following U.S. Patents are known to Applicant:
U.S. Pat. No. 2,303,424
U.S. Pat. No. 2,325,144
U.S. Pat. No. 3,333,474
German Pat. No. 743,326

However, none of these patents show an apparatus such as disclosed and claimed by Applicant. The above mentioned patents all relate to testing devices that are completely different than Applicant's and do not have the advantages of Applicant's.

OBJECTS OF THE INVENTION

It is an object of the invention to provide an improved arrow tester.

It is another object of the invention to provide an arrow tester wherein the arrow is loosely supported on the tester and is provided with a shaft support with a v-shaped notch in which the arrow shaft rests.

Another object of the invention is to provide an arrow tester that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

DETAILED DESCRIPTION OF DRAWINGS

Figures 1, 2:
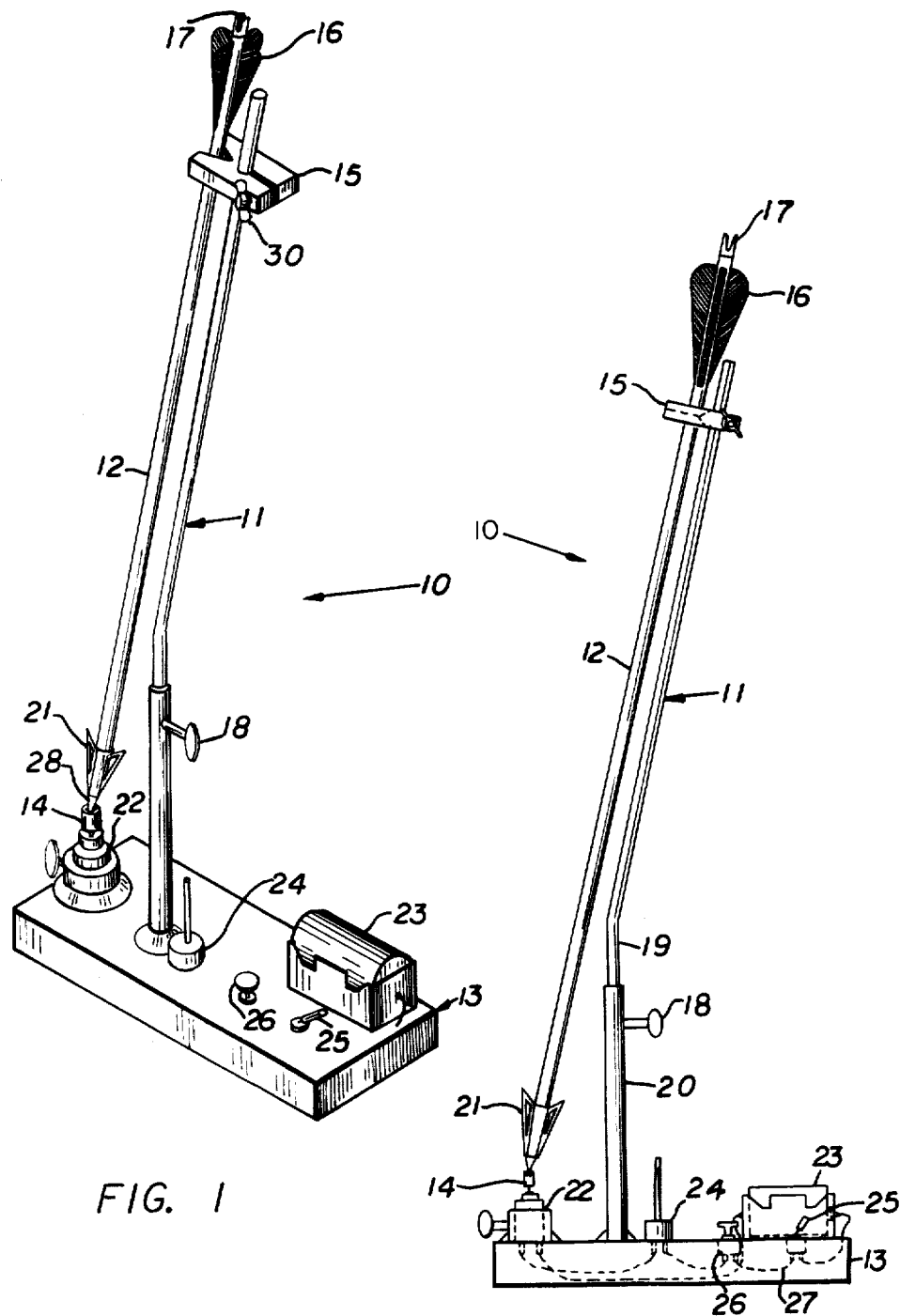
FIG. 1 is an isometric view of an arrow tester according to the invention.
FIG. 2 is a side view of the tester shown in FIG. 1.

Now with more particular reference to the drawings. An arrow checking device 10 is indicated for testing nock alignment and straightness having a base 13, a staff support 11 supported on the base 13 and extending upwardly therefrom, the shaft support 15 is attached to the end of the motor shaft of motor 22. The motor 22 is supported on the base and has a shaft extending upwardly and a shaft supporting collet having a conical recess in its upper side is provided. Point 28 of the arrow barb 21 rests in the conical recess. The tip support 14 rotates with the motor shaft when it is turned on and supplied energy from the battery 23 which is supported on the base 13. The upper rod of the support staff 11 is telescopically received in the lower tubular rod and held in place in adjusted vertical position by the thumb screw 18. The arrow has fletching 16 and nock 17. The tubular member 20 may extend vertically from base 13 and rod 19 may be bent at 31.

The motor 22 is connected to the battery 23 through the potentiometer 24 and the pause button 26 and a toggle switch 25 are connect in series with the motor circuit. To operate the device the operator will turn the potentiometer 24 down to put all of the resistance thereof into the motor circuit and then turn on the switch 25 you will then reduce the resistance from the circuit by rotating the handle of the potentiometer 24 until the arrow 12 is rotated at the desired speed. The machine can be stopped at any time by pressing the push button 26.

The arrow 12 rests in the v-shaped notch in the shaft support 15. The upper part 19 of the support staff 11 can be adjusted upwardly by loosening the thumb screw 18 and allowing the upper part 19 of the shaft support to move upwardly relative to the lower tubular part 20. When the v-shaped notched block 15 is in the proper position the operator can tighten the thumb screw 18 to secure the upper end 19 in the proper position relative to the lower part 20 of the support 11.

The v-block 15 is locked in its proper vertical position on the upper part 19 of the support by means of the thumb screw 30.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A device for testing arrows for nock alignment and straightness comprising,
   a base,
   a staff supported on said base and extending upwardly therefrom, a shaft support on said staff spaced from said base and a motor on said base having a shaft extending upwardly therefrom and an arrow tip support on said motor shaft,
   said shaft support on said staff having a v-shaped notch therein adapted to engage an arrow shaft whereby said arrow can be rotated by said motor to rotate said arrow shaft in said notch.

2. The tester recited in claim 1 wherein said device comprises a block attached to said staff and a part of said staff inclines away from a vertical line passing through said tip support,
   said block has said v-shaped notch therein adapted to receive said arrow shaft whereby said arrow leaning against said support may be rotated by said motor and the inaccuracy thereof be determined by visual observation.

3. The arrow testing device recited in claim 2 wherein said tip support has a conical recess in the upper side thereof and said conical recess is adapted to receive said arrow point.

4. The arrow testing device recited in claim 3 wherein said staff is made up of a tubular member connected to said base.

5. The arrow testing device recited in claim 4 wherein said energy source on said base is a battery and said battery is connected to the motor through a potentiometer whereby the speed of said motor can be controled and thereby the speed of rotation of said power support.

6. The arrow testing device recited in claim 5 wherein said potentiometer is connected to said battery in series with a toggle switch.

7. The arrow testing device recited in claim 6 wherein said toggle switch and potentiometer are connected to said battery and in series with a push button pause switch.

8. The arrow support recited in claim 7 wherein said staff comprises a generally cylindrical rodlike member telescopically received in a tubular base member and said base member is attached to said base.

9. The arrow testing device recited in claim 8 wherein said cylindrical part of said arrow support is disposed generally parallel to said arrow and has a lower end bent at an obtuse angle to said lower part of said arrow support staff.

10. The arrow testing device recited in claim 9 wherein said shaft support comprises a blocklike member having an opening slideably receiving said staff and a v-shaped notch in one side of said staff support adapted to have said arrow rest therein whereby said arrow supported on said tip support and disposed at an acute angle to the top of said base.

* * * * *